United States Patent [19]

Bauer et al.

[11] Patent Number: 5,446,673
[45] Date of Patent: Aug. 29, 1995

[54] SYSTEM AND METHOD FOR FINISH MACHINING AN IN-PROCESS PART HAVING AN INACCESSIBLE INTERIOR CAVITY

[75] Inventors: Lowell W. Bauer; Martin K. Lee, both of Schenectady, N.Y.

[73] Assignee: General Electric Company, Schenectady, N.Y.

[21] Appl. No.: 39,664

[22] Filed: Mar. 30, 1993

[51] Int. Cl.⁶ .............................................. G06F 17/00
[52] U.S. Cl. ........................... 364/474.37; 364/551.02; 364/474.34; 82/1.11; 73/618
[58] Field of Search ..................... 364/474.28–474.37, 364/551.01, 551.02, 563; 73/457, 461, 618–620, 623; 82/1.11

[56] References Cited

U.S. PATENT DOCUMENTS

| | | | |
|---|---|---|---|
| 3,834,256 | 9/1974 | Abbatiello et al. | 82/21 |
| 3,935,766 | 2/1976 | Masters | 82/21 |
| 4,574,387 | 3/1986 | Gignoux et al. | 364/563 X |
| 4,620,463 | 11/1986 | Horn et al. | 82/1 |
| 5,009,103 | 4/1991 | Sato et al. | 364/563 X |
| 5,016,199 | 5/1991 | McMurtry et al. | 364/474.37 X |
| 5,208,763 | 5/1993 | Hong et al. | 364/551.02 |
| 5,274,566 | 12/1993 | Reed et al. | 364/474.37 |
| 5,901,256 | 2/1990 | McMurtry et al. | 364/474.37 X |

Primary Examiner—Roy N. Envall, Jr.
Assistant Examiner—Brian C. Oakes
Attorney, Agent, or Firm—David C. Goldman; Paul R. Webb, II

[57] ABSTRACT

A system for finish machining an in-process part having an inaccessible interior cavity, an envelope of excess material to be machined, and a predefined minimum wall thickness includes a fixture for holding the in-process part to be finish machined. Also included is a co-ordinate measuring machine having a ball probe for measuring external co-ordinates of the in-process part and also having a sonic thickness probe for measuring wall thickness of the in-process part at various selected points on the part. A programmed digital computer is operably connected to the co-ordinate measuring machine to receive data regarding the measurements made. Stored in the computer is a model of the part which is to be machined and minimum wall thickness requirements at various points on the part. The computer is further programmed to calculate the optimal position of the final part in relation to its interior cavity such that wall thickness requirements are maximally satisfied over the total part surface.

9 Claims, 2 Drawing Sheets

SYSTEM AND METHOD FOR FINISH MACHINING AN IN-PROCESS PART HAVING AN INACCESSIBLE INTERIOR CAVITY

BACKGROUND OF THE INVENTION

Parts, such as aircraft engine airfoils may be fabricated with hollow interiors to save weight or material. Mechanical performance requires that a specified minimum wall thickness, which may not be constant, be maintained between the outside of the finished part and the interior cavity. However, the part manufacturing process may make it impossible to maintain the exact cavity shape or position. In such cases, the in-process part may be made overly thick and then the outside finish-machined to net shape. The process of positioning the finish machining envelop is complicated, however, when the interior cavity cannot be accessed because of its location or shape or because it is filled with other structural material. Prior art positioning techniques require the use of x-ray tomography to find wall thickness at various sections of a part. The position of the machining envelope is then determined manually using the x-ray pictures. This method is both expensive, slow, and prone to inaccuracy. What is needed therefore is an improved method for positioning the machining envelope which is quicker, more accurate and more automated.

SUMMARY OF THE INVENTION

A system for finish machining an in-process part having an inaccessible interior cavity, an envelope of excess material to be machined, and a predefined minimum wall thickness includes a fixture for holding the in-process part to be finish machined. Also included is a co-ordinate measuring machine having a ball probe for measuring external co-ordinates of the in-process part and also having a sonic thickness probe for measuring wall thickness of the in-process part at various selected points on the part. A programmed digital computer is operably connected to the co-ordinate measuring machine to receive data regarding the measurements made. Stored in the computer is a model of the part which is to be machined and wall thickness requirements at various points on the part. The computer is further programmed to calculate the optimal position of the final part in relation to its interior cavity such that wall thickness requirements are maximally satisfied over the total part surface.

The method of the present invention is practiced using the above described system. The computer first computationally locates the part model between the outside and inside surfaces of the as-built part and then performs a best-fit operation with respect to the outside surface. Next, an innermost surface is computed, which corresponds to a minimum-thickness part. The part model, stored in the computer, is moved computationally, in up to six degrees of freedom, to a position where it is enclosed by the outside surface and the innermost surface so that the minimum excess wall thickness over the required wall thickness is maximized. The method further includes using this computed surface model to program a numerical control device for machining the finished part. Original tool paths for the finished part may be modified according to the computed surface model. The method is terminated if at any point it is determined that the part surface model can not be completely placed inside the as-built outside surface or if it is impossible to meet all of the wall thickness requirements.

The method still further includes drawing a vector from the outside of the part surface towards and perpendicular to the model surface, moving along the vector by an amount equal to the measured wall thickness and then in the opposite direction, a distance equal to the minimum wall thickness requirement in order to locate the innermost surface. The number and location of points to be measured is based on the complexity and variability of the interior cavity.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
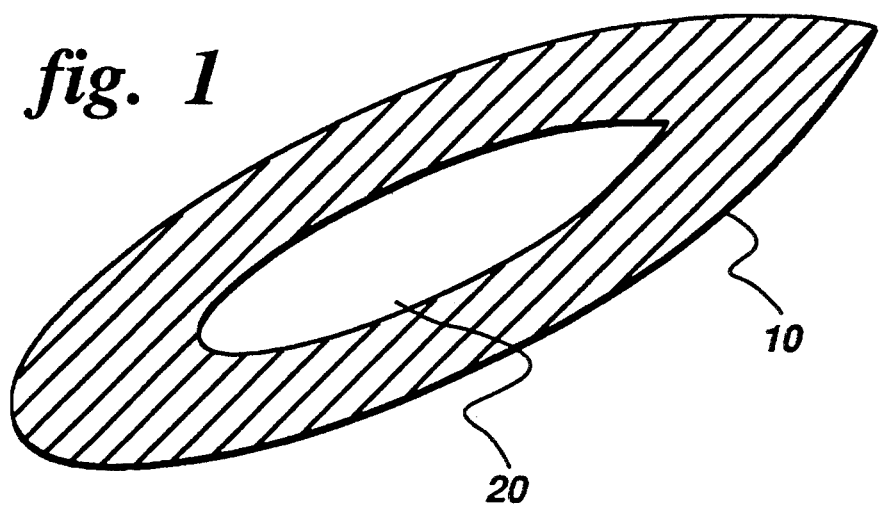
FIG. 1 is a diagram showing a cross-section of an in-process airfoil having an inaccessible interior cavity to be finish machined.

FIG. 1 shows a cross-section of an in-process part 10 having an inaccessible interior cavity 20. Part 10 may be for instance an aircraft engine blade or it may be any part having a hollow interior. The present invention is directed to the machining of the exterior envelope of such a part. The system and method of the present invention depend on such a part already having been manufactured to a point where all that is left to do is to finish machine the exterior of the part. The interior cavity 20 may be completely hollow or it may be a complicated internal structure having numerous smaller cavities.

Figure 2:
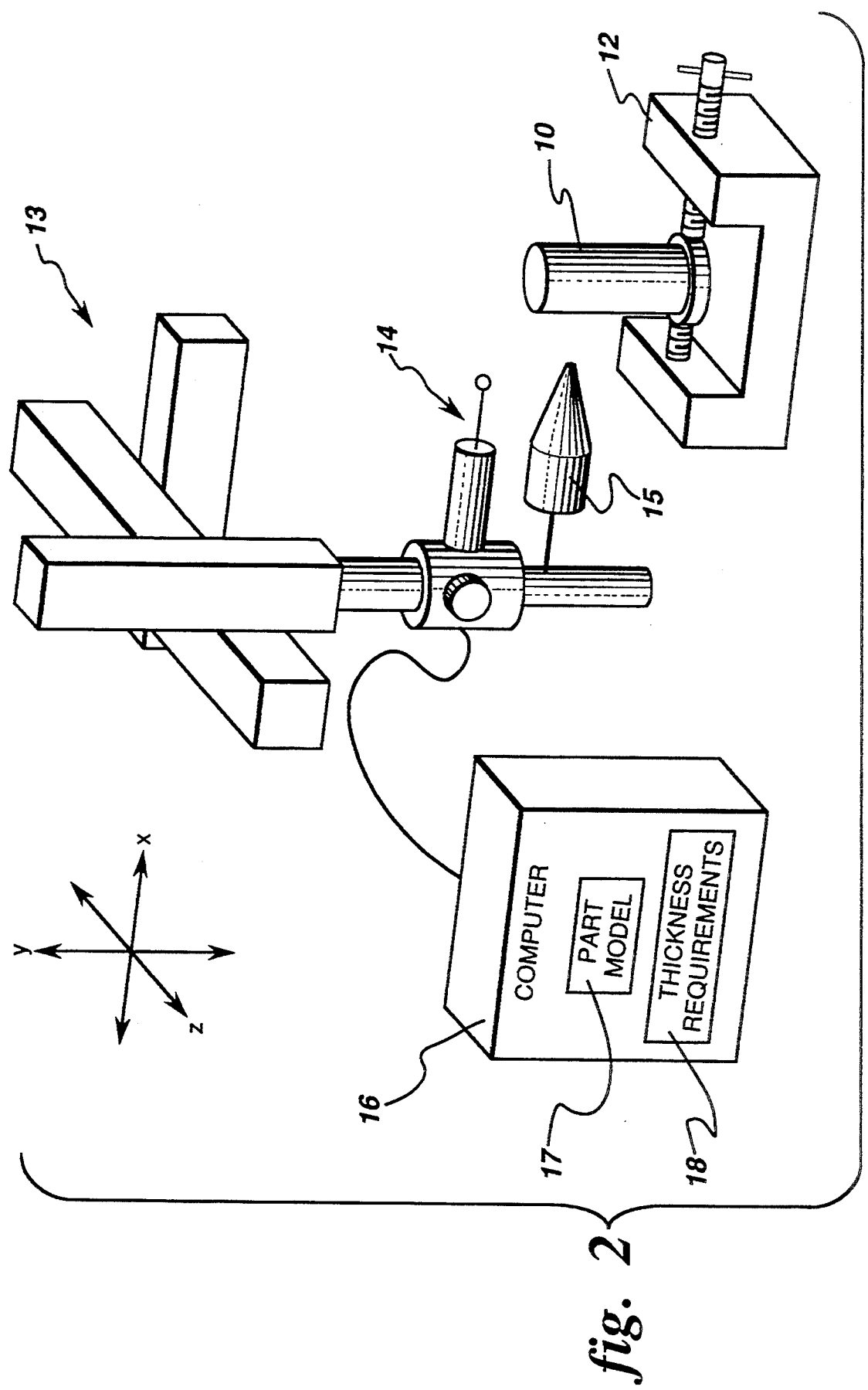
FIG. 2 is a representational view of the system of the present invention.

FIG. 2 shows a system according to the present invention and with which the method of the present invention may be practiced. Part 10 is shown being held in place by fixture 12. Programmable co-ordinate measurement machine (CMM) 13 is shown having a ball touch probe 14. A CMM with a touch probe is a well known device used for determining co-ordinates of part surfaces. Also shown in sonic thickness probe 15, also a well known device, for use with the CMM 13 in place of probe 14 to measure the thickness of the wall of part 10 at any given point. The thickness of the part wall at any point is the shortest distance from the exterior of the part to its internal cavity. Other well known devices for measuring co-ordinates and thickness can be used in place of those shown.

Computer 16, shown operably connected to CMM 13, has stored within its memory, a model 17 of a nominal part exterior surface having the shape of the final part which is to be manufactured. Such a model is stored in accordance with well known methods for storing geometric models in electronic form. Also stored with model 17 are part design specifications 18 which specify minimum allowable wall thicknesses at various points on the part surface. Measurements of the exterior of in-process part 10 and measurements of local wall thickness are fed from CMM 13 to computer 16. Computer 16, which can be any general purpose digital computer, is programmed to combine these measurements with stored model 17 to determine a best or optimal position of the nominal part in relation to the cavity in part 10. Alternatively, the problem may be viewed as finding the optimal location of the cavity within the final machined part. This optimal location is one which satisfies the wall thickness requirements at every point measured and also maximizes the minimum distance between the nominal part surface and the cavity.

Figure 3:
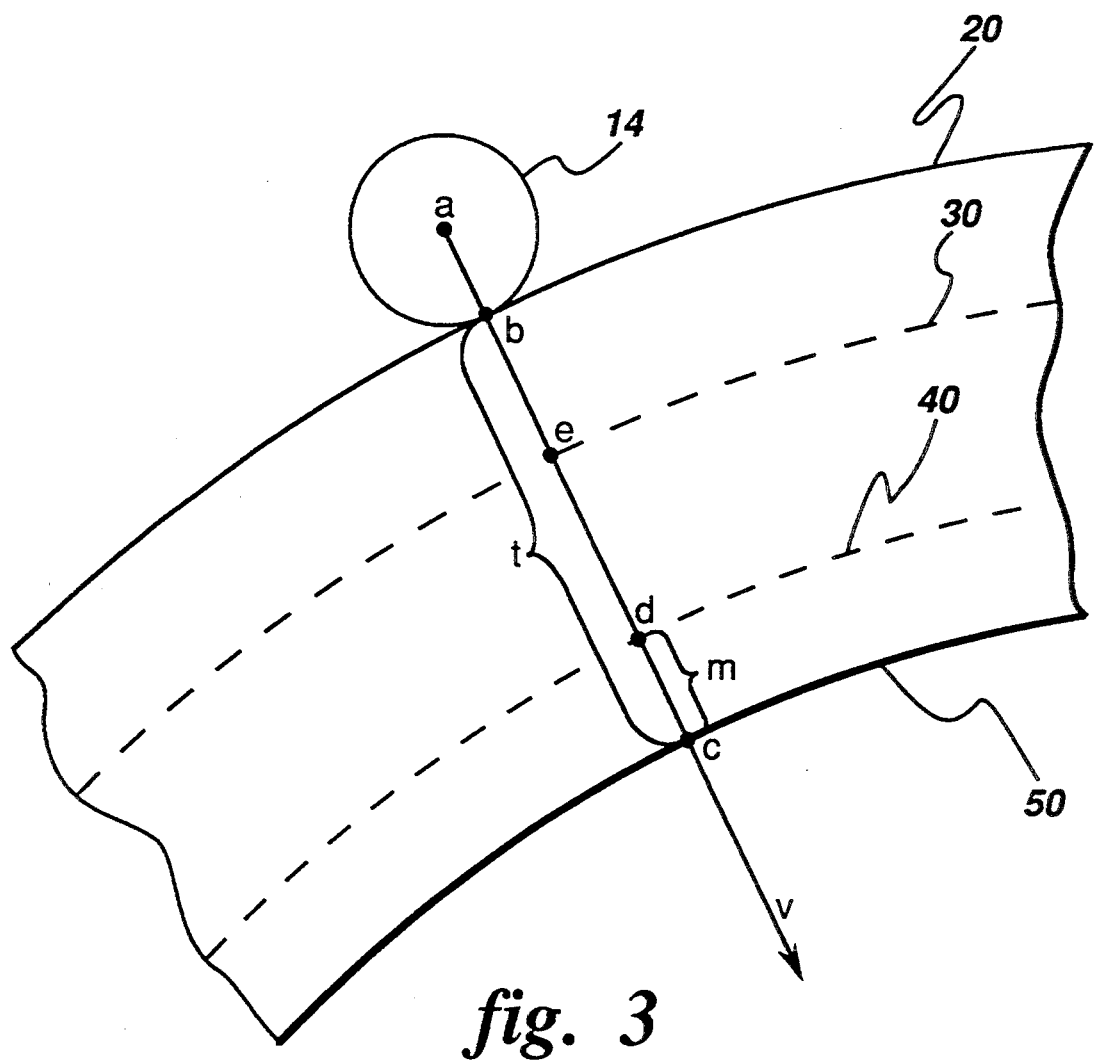
FIG. 3 is a two-dimensional view of the various surfaces involved in the method of the present invention.

The method for finding the optimal location of the nominal surface will now be described. FIG. 3 shows a ball probe 14 touching as-built part outside surface 20 at point b. Surface 30 is the nominal part surface as stored in computer 16. Surface 50 is the as-built part inside surface. Point a is the measured point and is the center of touch probe 14. As a first optimization step, nominal surface 30 is best fitted in relation to all of the measured points (of which point a is one) so that the following function is minimized:

$$\sum_{l=1}^{n} \|\overline{a_n e_n}\|^2$$

where $\overline{a_n e_n}$ is equal to the distance from point a to point e in FIG. 3. The optimization proceeds next to the step of drawing a vector v towards and perpendicular to the prepositioned nominal surface 30 from point a. By moving along vector V one probe radius length, point b, which represents a point on the outside in-process part, is located. Next, moving along v by an amount t, equal to the sonic measured wall thickness, locates point c, which represents a point on the inside as-built surface 50 and the interior cavity. Finally, by moving back along v a distance m, equal to the minimum required wall thickness, a point d is located which represents an innermost permissible final outside surface location where all such points like d are connected by surface 40. Nominal surface 30 is moved computationally in up to six degrees of freedom in accordance with well known methods, until all of the b points are outside and all of the d points are inside nominal surface 30 and the minimum of the distances from points d to nominal surface 30 is maximized. This maximized distance is a thickness in excess of the minimum required thickness at that point. The optimization is performed according to well known mathematical techniques. Existing tool paths for the finished part may be modified by translation and rotation according to the optimized position of the nominal part surface in order to create a new set of tool paths. These new tool paths can be the basis for programming a numerical control machine tool for machining the finished part according to well known techniques.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A system for finish machining an in-process part having an inaccessible interior cavity, an envelope of excess material to be machined, predefined minimum wall thickness requirements, and a requirement to maximize excess wall thicknesses, said system comprising:

a fixture for holding said in-process part to be finish machined;

a co-ordinate measurement machine having a ball probe for measuring external co-ordinates of said in-process part and a sonic thickness probe for measuring wall thickness of said in-process part at a plurality of selected points on said in-process part;

a computer, operably connected to said co-ordinate measurement machine, having a model of a nominal part stored in memory therein, wherein said computer is programmed to calculate an optimal position of said nominal part in relation to said inaccessible interior cavity within said in-process part, said computer computationally translating and rotating said nominal part until said predefined minimum wall thickness requirements are met and said excess wall thicknesses are maximized, said excess wall thicknesses defined as the difference between said nominal part surface and said minimum wall thickness requirements at any given point; and a numerical control device responsive to the computer for finish machining said in-process part according to the optimal position of said nominal part.

2. A method for finish machining an in-process part having an inaccessible interior cavity, a nominal surface model for said in-process part defining a desired shape of the outside surface of a finished in-process part having been stored in a memory of a computer, said in-process part having an existing in-process envelope of excess material to be machined according to predefined minimum wall thickness requirements and a requirement to maximize excess wall thicknesses, said wall thickness defined as the distance between said nominal part surface and said inaccessible interior cavity at any given point and said excess wall thicknesses defined as the difference between said nominal part surface and said minimum wall thickness requirements at any given point said method comprising the steps of:

measuring said in-process part surface co-ordinates and wall thickness at a plurality of points on said in-process part wherein said in-process part surface co-ordinates define an outside surface of said in-process part and said wall thickness defines an inside surface of said in-process part;

feeding said outside and inside surface data to a computer;

computationally locating, using said computer, said nominal surface model between said outside and inside surfaces;

performing a best fit operation on said nominal surface model in relation to said outside surface;

defining, in said computer, for each nominal part surface co-ordinate measured, an interior point defining an innermost location of a finish-machined surface which meets said minimum wall thickness requirements;

computationally translating and rotating said nominal surface model to a position where it is enclosed by said outside surface and said innermost finish machined surface and the excess wall thicknesses have been maximized; and using said computationally moved nominal surface model to program a numerical control device for finish machining said in-process part according to the position of said nominal part.

3. The method of claim 2 comprising the additional step of terminating the process if it is impossible to meet all of the wall thickness requirements after said moving step.

4. The method of claim 2 comprising the additional step of terminating the process if said nominal surface falls outside said outside surface.

5. The method of claim 2 wherein said using step comprises modifying tool paths for said nominal model according to the movement of said model.

6. The method of claim 2 wherein the step of computationally locating said nominal surface model comprises best-fitting said model among said part surface co-ordinates such that the square of the sum of the distances to said co-ordinates is minimized.

7. The method of claim 2 wherein the step of measuring includes using a CMM touch probe and a sonic thickness probe.

8. The method of claim 2 wherein the step of defining an interior point comprises drawing a vector from a measured part surface co-ordinate towards and perpendicular to said nominal surface, moving along said vector by an amount equal to the measured wall thickness at said part surface co-ordinate, and moving in the opposite direction a distance equal to the minimum wall thickness requirement.

9. The method of claim 2 comprising an additional first step of determining the number and location of points to be sampled based on knowledge of said cavity structure.

* * * * *